United States Patent [19]
Humphrey et al.

[11] Patent Number: 6,130,918
[45] Date of Patent: Oct. 10, 2000

[54] METHOD AND APPARATUS FOR REDUCING THE PEAK-TO-AVERAGE RATIO IN A MULTICARRIER COMMUNICATION SYSTEM

[75] Inventors: Leslie D Humphrey; Andrew David Wallace, both of Harlow, United Kingdom

[73] Assignee: Nortel Networks Limited, Montreal, Canada

[21] Appl. No.: 08/980,504

[22] Filed: Dec. 1, 1997

[51] Int. Cl.[7] .................................................. H04L 27/04
[52] U.S. Cl. .......................................... 375/295; 375/285
[58] Field of Search .................................... 375/295, 285, 375/284, 261, 279, 280; 570/206, 210, 28, 464

[56] References Cited

U.S. PATENT DOCUMENTS

| | | |
|---|---|---|
| 4,529,950 | 7/1985 | Chazenfus et al. . |
| 5,166,924 | 11/1992 | Moose ..................................... 370/32.1 |
| 5,285,474 | 2/1994 | Chow et al. .............................. 375/13 |
| 5,479,447 | 12/1995 | Chow et al. ............................. 375/260 |
| 5,537,435 | 7/1996 | Carney et al. ........................... 375/219 |
| 5,610,908 | 3/1997 | Shelswell et al. . |
| 5,787,113 | 7/1998 | Chow et al. ............................. 375/219 |
| 5,909,463 | 6/1999 | Johnson et al. ......................... 375/220 |
| 5,917,809 | 6/1999 | Ribner et al. ............................ 370/286 |

FOREIGN PATENT DOCUMENTS

| | | |
|---|---|---|
| 0 836 303 A2 | 4/1998 | European Pat. Off. . |
| 2 309 262 | 7/1997 | United Kingdom . |
| 2 317 795 | 4/1998 | United Kingdom . |
| WO 97/26743 | 1/1997 | WIPO ............................ H04L 27/26 |

OTHER PUBLICATIONS

"A Method to Reduce the Probability of Clipping in DMT–Based Transceivers" by Mestdagh and Spruyt IEEE Transactions on Communications, vol. 44, No. 10, Oct. 1996.

"Dynamic Scaling for Clip Mitigation in ADSL Standard, Issue 2" by Cioffi and Brigham Submission IS Standards Committee TI–Telecommunications, Jan. 22, 1996.

"Draft ADSL Issue Text for Dynamic Clip Scaling" by Coiffi et al Submission IS Standards Committee TI–Telecommunications (Distribution TIEI.Apr. 1997–226RI) Sep. 22–26, 1997.

"Efficient Algorithm for Clip Probability Reduction" Present on Behalf of Orckit Communications Limited IS Standards Committee TI–Telecommunications (Distribution TIEI.Apr. 1997–323) Minneapolis, Sep. 21–25, 1997.

*Primary Examiner*—Chi H. Pham
*Assistant Examiner*—Emmanuel Bayard
*Attorney, Agent, or Firm*—Lee, Mann, Smith, McWilliams, Sweeney & Ohlson

[57] ABSTRACT

A reduction in a peak-to-mean envelope power ratio of a multicarrier signal, represented as a time domain signal, is achieved by applying (76) an offset, indicative of a difference (74) between a mean signal level and a midpoint level of the time domain signal, to the time domain signal. Alternatively, constellation values of positive and negative frequency components are modified by differing functions to produce a modified data set. Preferably, the negative frequency components are set to a predetermined value (namely zero (124)) to provide an alternate coding scheme Once the multicarrier signal has been converted into a time domain representation, real and imaginary parts (126–128) of the modified data set that consequently only contain positive frequency components and zeros are compared with one another to identify (130) which of the real and imaginary parts has a lower peak-to-average signal ratio (134) for the time domain representation. Then, based upon which of the peak-to-average signal ratios is lowest (136), either the real and imaginary part of the time domain signal is selected for subsequent transmission (138).

42 Claims, 6 Drawing Sheets

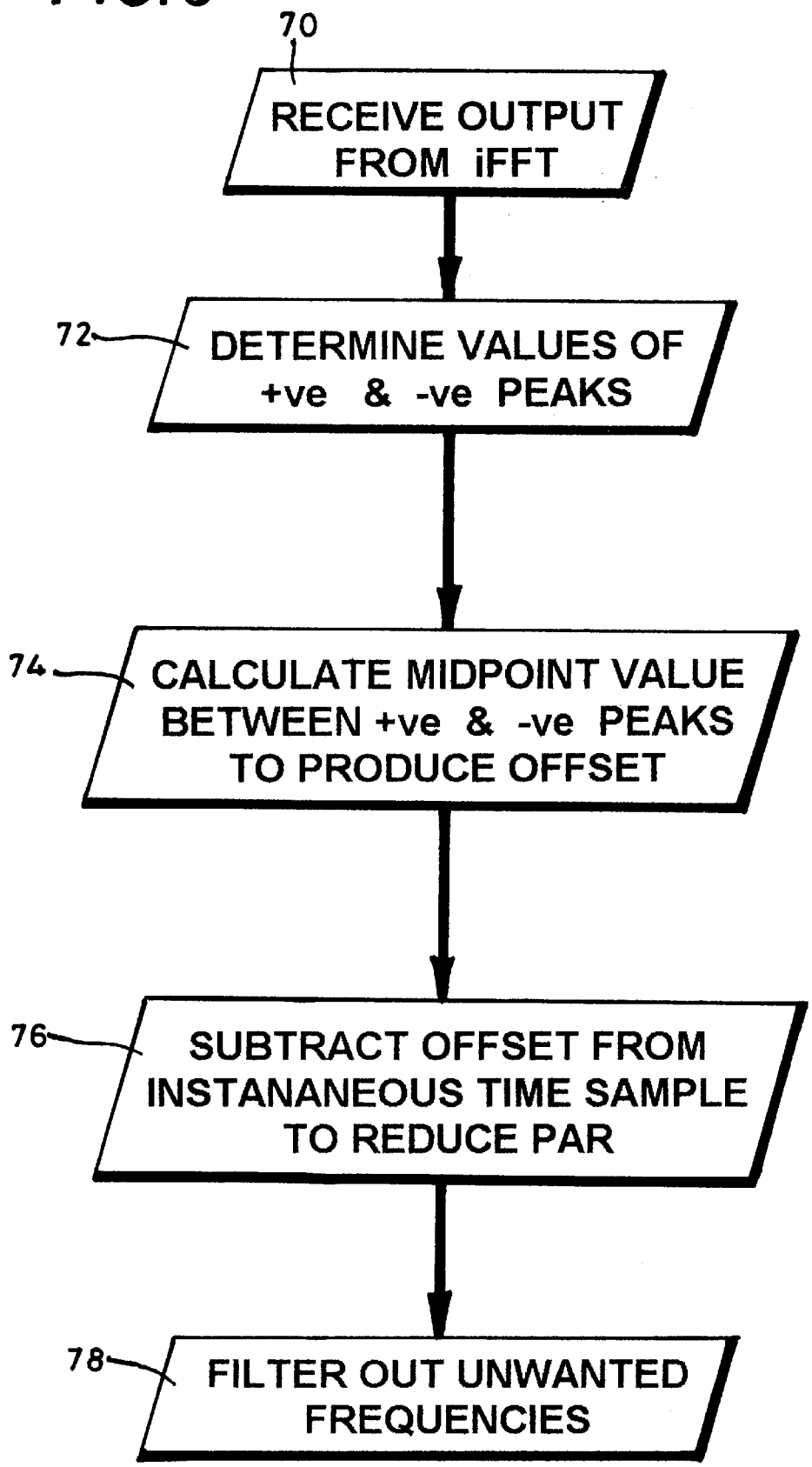

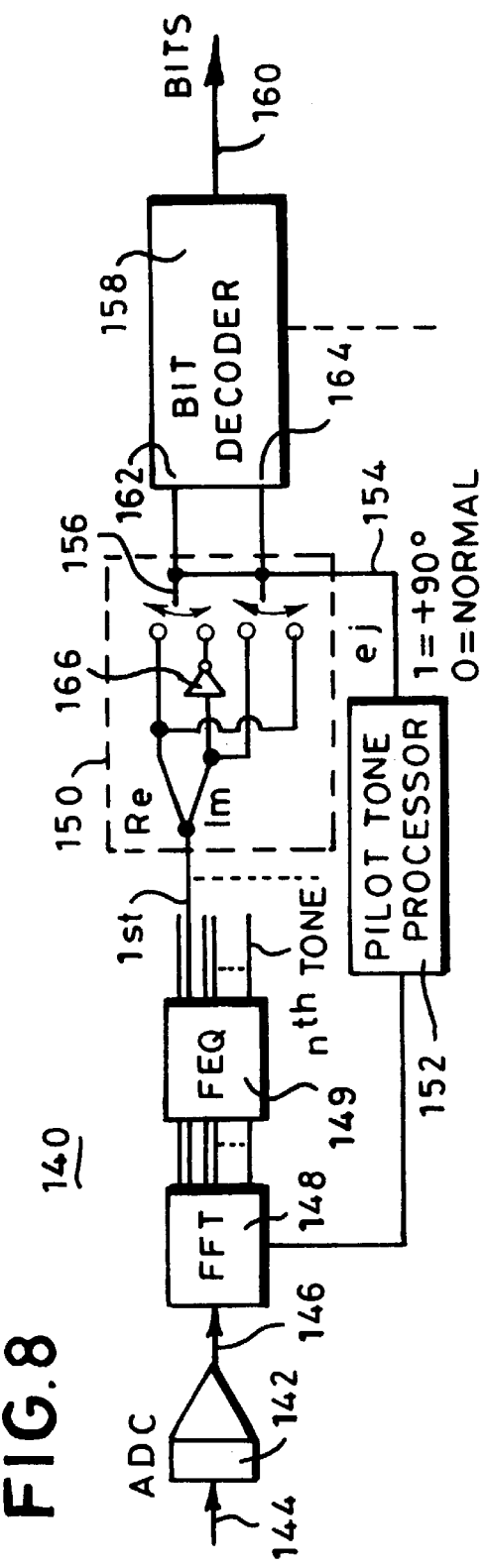
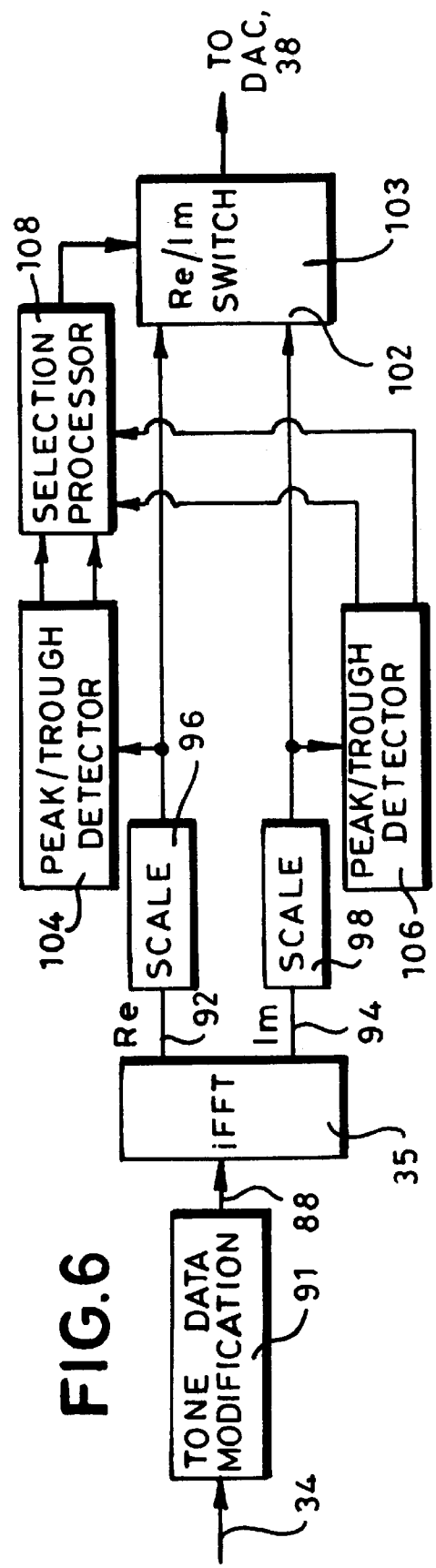
FIG.8
FIG.6

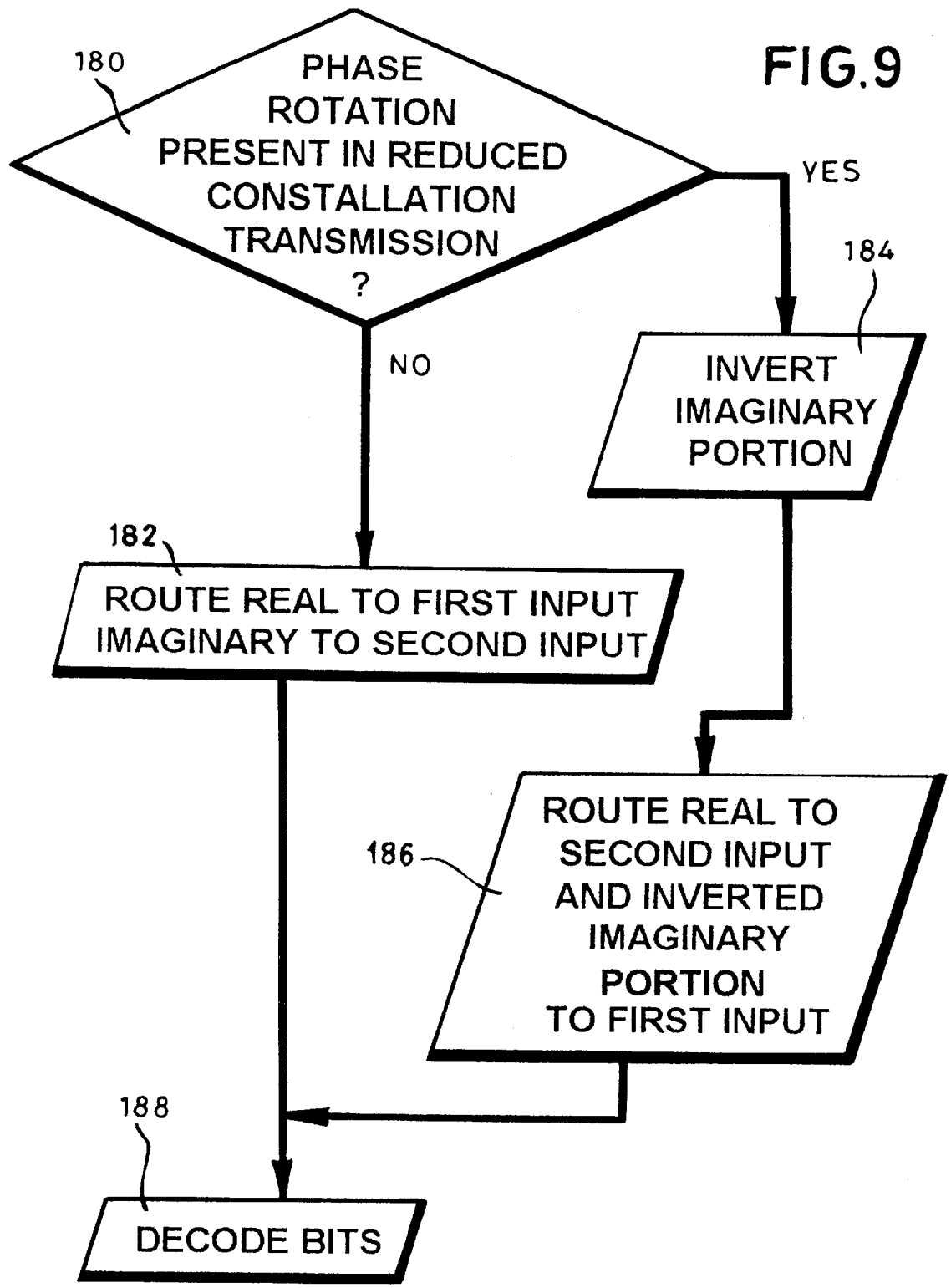

METHOD AND APPARATUS FOR REDUCING THE PEAK-TO-AVERAGE RATIO IN A MULTICARRIER COMMUNICATION SYSTEM

BACKGROUND TO THE INVENTION

This invention relates, in general, to a method and apparatus for reducing the peak-to-average (signal or power) ratio in a multicarrier communication system, and is particularly, but not exclusively, applicable to reducing the effects of signal clipping in a block orthogonal signalling scheme, such as used in Discrete Multi-Tone (DMT) systems.

SUMMARY OF THE PRIOR ART

Multicarrier transmission schemes, such as DMT and Orthogonal Frequency Division Multiplexing (OFDM), have been proposed for many different types of communication system, including Digital Audio Broadcasting (DAB) and broadband wireless Local Area Networks (LANs). The advantage of such schemes is that highly time dispersive channels can be equalised efficiently to provide transmission data rates that when combined with forwards error correction techniques, are capable of approaching the theoretical "Shannon Capacity" for a noisy channel. A highly dispersive channel may arise from a combination of multiple discrete, delayed and attenuated, particularly in radio environments, or may be an intrinsic property of a transmission medium (such as within a wireline copper-pair or a fibre-optic transmission system) where the group delay is a continuous function of frequency Additionally, these types of multicarrier systems are particularly suited to high bandwidth application having data rates in the region of 2 Megabits per second (Mbps) and above. Unfortunately, the composite signal envelope produced by DMT, for example, exhibits a high "peak-to-average ratio" (PAR), which term is also sometimes referred to the "peak-to-mean envelope power ratio" (PMEPR) or the "the crest factor" Moreover in order to mitigate against the effects of distortion and spectral spreading (e.g. adjacent channel splatter) in multicarrier systems, a linear (and consequently inefficient) transmit amplifier is required for amplification of this composite signal envelope.

In a multicarrier system, the effects induced by the inherent time delays are mitigated against by distributing data amongst a plurality of frequency related sub-channels. For example, a second sub-channel may have twice the frequency of a first sub-channel, while third sub-channel may have thrice the frequency of first sub-channel (and so on). Distribution of data in this fashion has the effect that each independent, narrowband sub-channel is less susceptible to the inherent delay spread, as will be understood. Consequently, a time domain waveform of the multicarrier system, such as DMT or OFDM, has a complicated composite signal envelope generated by the superposition of individual signals from each sub-channel. More particularly, the composite signal envelope contains power (or amplitude) spikes separated by a relatively low (but oscillating) signal profile, with the power spikes having a peak envelope power (PEP) substantially greater in value than an average (rms) power level for the entire composite envelope.

A significant PAR places demanding requirements on the operating characteristics of digital-to-analog converters (DAC) within a multicarrier transmitter (or analog-to-digital converters ADC in a multicarrier receiver), and particularly in relation to the power consumption and heat dissipation within power or line amplifiers of such multicarrier transmitters and receivers. Indeed, a dynamic range of a typical multicarrier encoder is set so that the average transmitted power is between 10dB to 15dB below the peak output power of the DAC; this being particularly so in the case of DMT systems. In practice, the application of this parameter means that there is a finite probability that the DMT (or other suitable encoded multicarrier) data will contain samples that exceed the dynamic range of realisable, low-cost DACs.

DACs can be designed to possess sufficient dynamic range to accommodate the extreme fluctuations in signal levels (but such devices are expensive as a result of the increased processing power required to maintain present noise quantization levels), while the problems associated with power consumption, heat dissipation, linear amplifier operation and the general efficiency of amplifiers (arising from the excessive peaks in the composite signal envelope) are yet to be addressed satisfactorily. Indeed, power consumption (i.e. current drain) by the amplifier is of particular concern when one considers that multicarrier transceivers are being implemented in battery-powered mobile environments having a limited energy-storage capacity. In addition to the foregoing disadvantages, the average power of a multicarrier signal (for a specified Peak Envelope Power (PEP) limit) is considerably lower than that for a constant envelope, single carrier signal (such as a Gaussian Minimum Shift-Keyed (GMSK) signal used in cellular communication systems, for example). Consequently, the selection of a multicarrier transmission scheme for a system does not currently utilise the available power range to a maximum extent.

As will be appreciated, the aforementioned problems are, however, generally applicable to block orthogonal signalling schemes supported on multiple sub-carrier channels from which a sinusoidal signal set is generated (typically) through an inverse fast-Fourier transform (iFFT) technique. For the sake of completeness, the skilled addressee will realise that the signal set will typically also include a prefix or suffix generated by cyclic extension, while the information sequence is framed by abutting together contiguous composite signal envelopes.

As such, there is a desire to reduce the PAR (or PMEPR) of multicarrier transmission schemes in order to obtain the inherent advantages associated with the use of multicarrier signals in the limited frequency spectrum available to communication systems, generally.

The problems presented above are addressed in the paper entitled "A method to reduce the probability of clipping in DMT-based transceivers" by Mestdagh and Spruyt, IEEE Transactions on Communications, vol. 44, no. 10, October 1996. In this paper, the authors suggest using an alternative coding scheme if an initial fast inverse Fourier transform and first coding scheme yields unacceptable results (in terms of the PAR, for example). More particularly, if an originally generated DMT symbol has at least one sample whose amplitude exceeds a predefined level, then this DMT symbol is rejected and not therefore passed to the transmitter front-end. Instead, the phasor of each sub-channel is changed by means of a fixed phasor-transformation and a new DMT symbol generated by the iFFT. In other words, if a sample at an output of an iFFT causes the DAC to "clip", then information (i.e. data) in the frequency domain is re-encoded using a different coding scheme or law. However, this mechanism requires knowledge of the signalling scheme to be relayed across the communication resource on a dedicated signalling channel having a specified signalling and coding scheme.

In relation to the phenomena of clipping, a clip can be considered as an impulse of noise that is applied to the signal. In a receiver, the FFT will then distribute this noise equally across all sub-channels (or sub-carriers); of which there are 256 sub-carriers in an asymmetrical digital subscriber loop implemented according to American National Standard T1.413. In an ADSL-DMT system capable of generating a signal having a PAR of 5.6, a clip would nevertheless occur approximately once every $10^5$ symbols (i.e. approximately every 25 seconds), which clip would produce a signal-to-clipping ratio (SCR) of approximately 38 dB. Unfortunately, such an SCR would induce a very high error rate ($>10^{-1}$) on all sub-channels carrying ten or more bits, albeit that interleaving and forward error correction functions might be able to correct this error in the unlikely event that the signal was not simultaneously subject to other forms of impulse noise.

A conflict therefore exists in the implementation of systems such as ADSL, Very high speed Digital Subscriber loops (VDSL) and multicarrier systems (generally) because the number and severity of the clip events decreases as the PAR handling capacity of the system increases. Specifically, when a clip does occur, a DAC having the capability of transmitting a signal with a PAR greater than 5.6 will add a smaller error to the resulting signal because the DAC is better able to follow incident high amplitude signals (which may have a significantly higher PAR, perhaps ~1000 for a DMT system) Unfortunately, an ability to handle a higher PAR substantially increases the cost and power consumption of the DAC and output amplifier to an often unacceptable level.

It is also noted that current DMT systems have a parameter that is associated with the highest PAR that can be sustained without clipping, although by changing the gain of the signal path ahead of the ADC the maximum PAR can be varied; albeit that this is at the expense of relative quantization noise.

An alternative scheme has been proposed by J. Cioffi and J. Bingham in their submission to the Standards Committee T1-Telecommunications and titled "Dynamic scaling for clip mitigation in ADSL standard, issue 2" (dated Jan. 22, 1996) Specifically, a reduction in the PAR is achieved by checking the digital output of the iFFT for potential clips, and then applying a suitable attenuation (of either 1 dB, 2 dB or 3 dB) if a clip is detected in one or more samples of a symbol In the event that a level of the symbol has been reduced, then information concerning the level of attenuation is sent on a pre-assigned sub-carrier in that symbol. However, this system is crude and does not necessarily provide sufficient compensation to offset extremely large instantaneous power spikes and nonetheless reduces systems capacity by requiring a dedicated (signalling) sub-channel to support and relay user information. In fact, although clipping could be avoided by scaling all the outputs associated with a particular signal to a level whereby the largest instantaneous sample ($2^n$ samples with associated cyclic extensions being equal to 1 symbol) is assigned a peak level equivalent to maximum (peak) operating parameter of the DAC (or amplifier), the scaling required would need to be continuously updated by sending significant amounts of control information over the dedicated signalling sub-channel. Furthermore, the dedicated signalling sub-channel would also need to be scaled to ensure that control information was not itself corrupted by power spikes and that a meaningful attenuation status for each symbol was therefore received in the demodulator prior to decoding the encoded user information.

To alleviate (to some extent) the requirement of having to send excessive control information, the paper by J. Cioffi and J. Bingham does propose the use of a limited four-level quadrature amplitude modulation (4-QAM) scheme in which a level of attenuation is relayed in one of four states on the signalling sub-channel This modulation scheme can then be decoded in the receiver, prior to de-scaling from phase information associated with the 4-QAM constellation.

A further paper by J. Coffi et al entitled "Draft ADSL Issue Text for Dynamic Clip Scaling" presented on Sep. 22–26, 1997 to Standards Committee T1-Telecommunications (Distribution T1E1.4/97-226R1) gives further insight into the multi-grain scheme proposed in the aforementioned original submission. Specifically, this second paper details the signalling scheme which is used during modem start-up to indicate whether a modem pair can support a dynamic clip scaling feature This second paper further presents mathematical analysis of the benefits that result from use of the architecture.

Another paper presented to Standards Committee T1-Telecommunications (Distribution T1E1.4/97-323; Minneapolis, Sep. 21–25, 1997) on behalf of Orckit Communication Limited and entitled "Efficient Algorithm for Clip Probability Reduction" describes a scheme whereby the output of an inverse fast-Fourier transform is split into its contributing components, namely odd and even multiples of its carrier frequency, respectively. The even contribution component is then modified by one or more of: i) a time displacement by N/8, N/4 or 3N/8 samples: or ii) time reversal. The odd contribution component is left unaltered. Summation together of the odd contribution component and the modified even contribution component therefore yields a new output signal having a different characteristic. Moreover, if a DAC clip would still occur, a different transformation form the possible set of seven can be applied to the even component contribution. However, this system requires the use of additional signalling that unfortunately and necessarily consumes more of the limited but available system bandwidth.

SUMMARY OF THE INVENTION

According to a first aspect of the present invention there is provided a circuit in a communication device arranged simultaneously to transmit information on multiple sub-channels, the information represented as a time domain signal having positive and negative peak levels, at least one of the positive and negative peak levels having a relatively large signal level displacement with respect to an rms level for the time domain signal, the circuit comprising: a peak detector, responsive to the time domain signal, for quantifying the positive and the negative peak levels, offset generating means coupled to receive and sum together the quantified positive and negative peak levels from the peak detector to produce an offset substantially equal to a midpoint value of the time domain signal, and a subtraction unit coupled to subtract the offset from the time domain signal to balance the time domain signal such that the positive and negative peak levels have substantially the same modulus, whereby the circuit reduces a peak-to-average level of the time domain signal.

In a preferred embodiment, the offset generating means further comprises an averaging circuit responsive to the positive and negative peak levels, wherein the offset is provided to the subtraction unit by the averaging circuit.

In a second aspect of the present invention there is provided a circuit for a communication device arranged simultaneously to transmit information on multiple sub-channels, the information represented as a composite time domain signal having positive and negative peak levels, at least one of the positive and negative peak levels having a relatively large signal level displacement with respect to an rms level for the time domain signal, the circuit comprising means for applying an offset, indicative of a difference between a mean level and a midpoint level of the time domain, to the time domain signal such as to reduce a peak-to-mean envelope power ratio of the time domain signal by setting the positive and negative peak levels to have substantially the same modulus.

In another aspect of the present invention there is provided a circuit for a communication device arranged simultaneously to transmit information, represented by constellation values, on multiple sub-channels, the circuit comprising: means for applying constellation values to positive frequency components and negative frequency components of each information-bearing sub-channel, means for applying different functions to the constellation values of each sub-channel to produce a modified data set; means for generating, from the modified data set, a time domain representation having real and imaginary parts; means for identifying which of the real and imaginary parts has a lower peak to average signal ratio, and means for selecting one of the real and imaginary parts for transmission corresponding to the lower peak to average signal ratio.

In a preferred embodiment the positive frequency components and the negative frequency components of each of the sub-channels form first and second subsets containing mutually exclusive frequency components, wherein the different functions are applied to the constellation values of differing ones of the first and second subsets. In an alternative, the first and second subsets contain a mixture of mutually exclusive positive frequency components and negative frequency components.

Preferably, one of the different functions is a zeroing function, whereby a first subset, for example, produces positive frequency components and zeros in the modified data set.

The circuit of a preferred embodiment may also comprise means for scaling the real and imaginary parts to normalise to a root-mean-square power level., which means for scaling may be a doubling function.

In a further aspect of the present invention there is provided a method of reducing a peak-to-average level of a time domain signal having positive and negative peak levels, the time domain signal supporting a simultaneous transmission of information on multiple sub-channels and wherein at least one of the positive and negative peak levels has a relatively large signal level displacement with respect to an rms level for the time domain signal, the method comprising the steps of: quantifying the positive and negative peak levels of the time domain signal; summing together the quantified positive and negative peak levels from the peak detector to produce an offset substantially equal to a midpoint value of the time domain signal; and subtracting the offset from the time domain signal to balance the time domain signal such that the positive and negative peak levels have substantially the same modulus.

In yet another aspect of the present invention there is provided a method of reducing a peak-to-average level of a multicarrier signal supporting a simultaneous transmission of information, represented by constellation values, on multiple sub-channels, the method comprising the steps of: applying identical constellation values to the positive frequency components and negative frequency components of each information-bearing sub-channel; applying different functions to the constellation values of each sub-channel to produce a modified data signal; generating, from the modified data signal, a time domain representation having real and imaginary parts; identifying which of the real and imaginary parts has a lower peak to average signal ratio; and selecting one of the real and imaginary parts for transmission corresponding to the lower peak to average signal ratio.

In still yet another aspect of the present invention there is provided a receiver circuit arranged to decode information contained in a multicarrier signal comprised from a plurality of sub-channel tones, the receiver circuit responsive to a time domain signal in which information is only sent in one of a real part and an imaginary part of the time domain signal, the receiver circuit comprising means for separating the multicarrier signal into the plurality of sub-channel tones; a bit decoder, coupled to receive both real and imaginary parts of each of the plurality of sub-channel tones, for recovering the information, means for determining a phase of the multicarrier signal; and means, responsive to the phase of the multicarrier signal and coupled to the bit decoder, for selectively causing phase rotation of the plurality of sub-channel tones to enable the bit decoder to decode differing phase-altered sub-channel tones.

In another aspect of the present invention there is provided a method of reducing a peak-to-average level of a multicarrier signal supporting a simultaneous transmission of information, represented by data values, on multiple sub-channel tones, the method comprising the steps of: modulating a data value onto constellation points by applying different functions to respective positive frequency components and negative frequency components of each information-bearing sub-channel tone to produce a modified data signal, generating, from the modified data signal, a time domain representation having real and imaginary parts, identifying which of the real and imaginary parts has a lower peak to average signal ratio; and selecting one of the real and imaginary parts for transmission corresponding to the lower peak to average signal ratio.

Advantageously, the present invention provides a mechanism for reducing the peak to average power in a multicarrier environment (such as DMT), while avoiding the necessity either to modifying extensively the transmit and receive circuitry, to use dedicated sub-channels or to use distinct coding/modulation techniques Indeed, in this latter respect, a receiver could be modified to Interpret an enhanced DMT transmission (generated according to the aspects of the present invention) by merely providing a revised software decoding algorithm (potentially downloaded to the receiver in an over-the-air fashion), although a hardware implementation would be inexpensive to produce and would contain discrete but commonly available circuit components, such as inverters and logic switches/gates. Generally, the present invention can be implemented without requiring a change in the structure of present-day DMT demodulators, and so it lends itself to system migration.

As a direct consequence of reducing the PAR in a DMT environment (or the like), the present invention secures a valuable power saving in relation to line amplifiers, and hence encourages the implementation of multicarrier transmission schemes in a mobile communication environment, such multicarrier transmission schemes (generally termed "block-orientated orthogonal multicarrier coding schemes").

BRIEF DESCRIPTION OF THE DRAWINGS

Exemplary embodiments of the different aspects of the present invention will now be described with reference to the accompanying drawings, in which:

FIG. 5 is a flow chart of a mechanism employed by the PAR reduction circuit of FIG. 4;

FIG. 6 shows a block diagram of a PAR reduction circuit according to a preferred embodiment of a second aspect of the present invention;

FIG. 8 is a block diagram of a multicarrier demodulator according to a preferred embodiment of the second aspect; and FIG. 9 summarises the basic process steps for receiving a reduced constellation multicarrier signal generated by the multicarrier demodulator of FIG. 8.

DETAILED DESCRIPTION OF A PREFERRED EMBODIMENT

Figure 1:
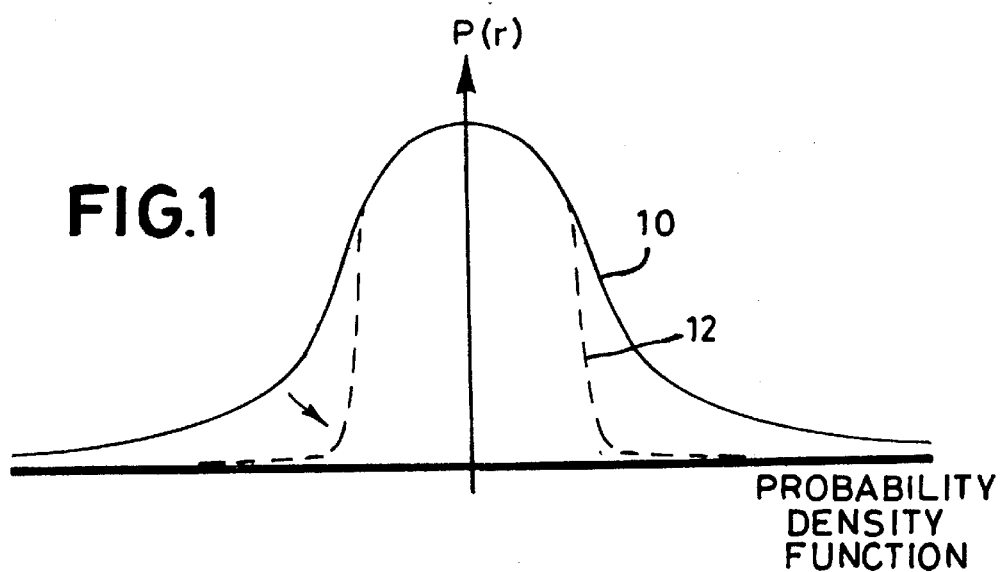
FIG. 1 shows a typical probability density function and graphically illustrates how such a probability density function can be improved in relation to a multicarrier signal, such as a DMT signal.

Referring to FIG. 1, a typical probability density function 10 has a distribution that approximates to a Gaussian function. The present invention is arranged to change the probability density function of a multicarrier (particularly a DMT) signal so that the probability of a DAC clip is significantly reduced (principally by ensuring that the probability density function falls away to zero more quickly than a signal exhibiting a pure Gaussian probability distribution). A modified probability density function 12, produced by the various aspects of the present invention, is illustrated in dotted outline. Consequently, when clips are experienced in either the multicarrier modulator or multicarrier demodulator, the effect on data recovery is reduced and preferably rendered non-corruptive with respect to the integrity of the received decoded data.

Figure 2:
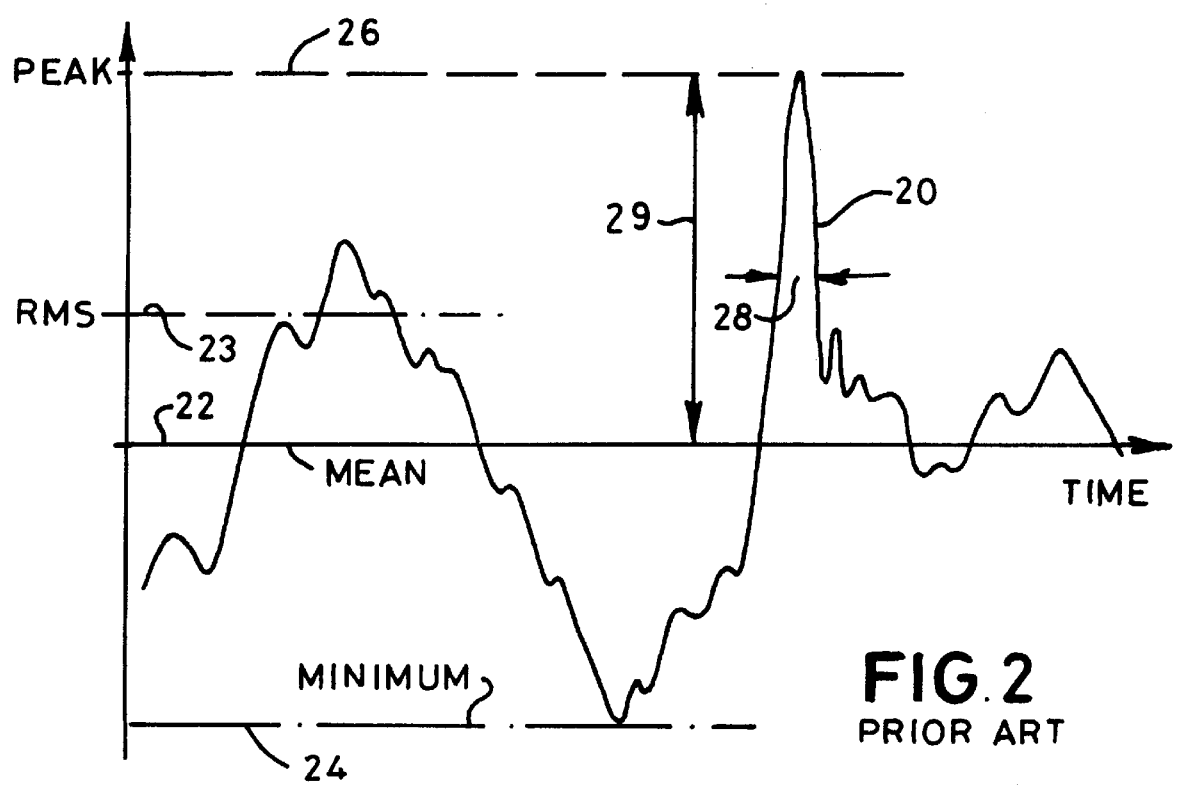
FIG. 2 illustrates a time domain representation 20 of a signal output from a prior art iFFT function.

FIG. 2 illustrates a time domain representation 20 of a signal output from a prior art iFFT function. As will be appreciated, the time domain representation 20 is generated from the superposition of a plurality of narrowband sub-channels that typically share a fixed frequency offset or harmonic relationship with one another; a complicated and composite signal envelope (or waveform) is hence produced. Indeed, the spacing between sub-channels is orthogonal, i.e. there is no interference between sub-channels (interchangeably known as "carriers" or "tones"). The time domain representation 20 has a signal level that oscillates about a mean signal level 22, with the oscillations dipping aperiodically to a minimum signal level 24 at a trough and aperiodically rising to a maximum peak level 26 The maximum peak level 26 (or indeed the minimum signal level 24) potentially represents a sample in the symbol that will cause clipping in the DAC, with the peak typically having a short time duration 28. As will be appreciated, the ratio of the peak 28 to a root mean square (rms) value 23 represents the PAR for a DMT signal.

Figure 3:
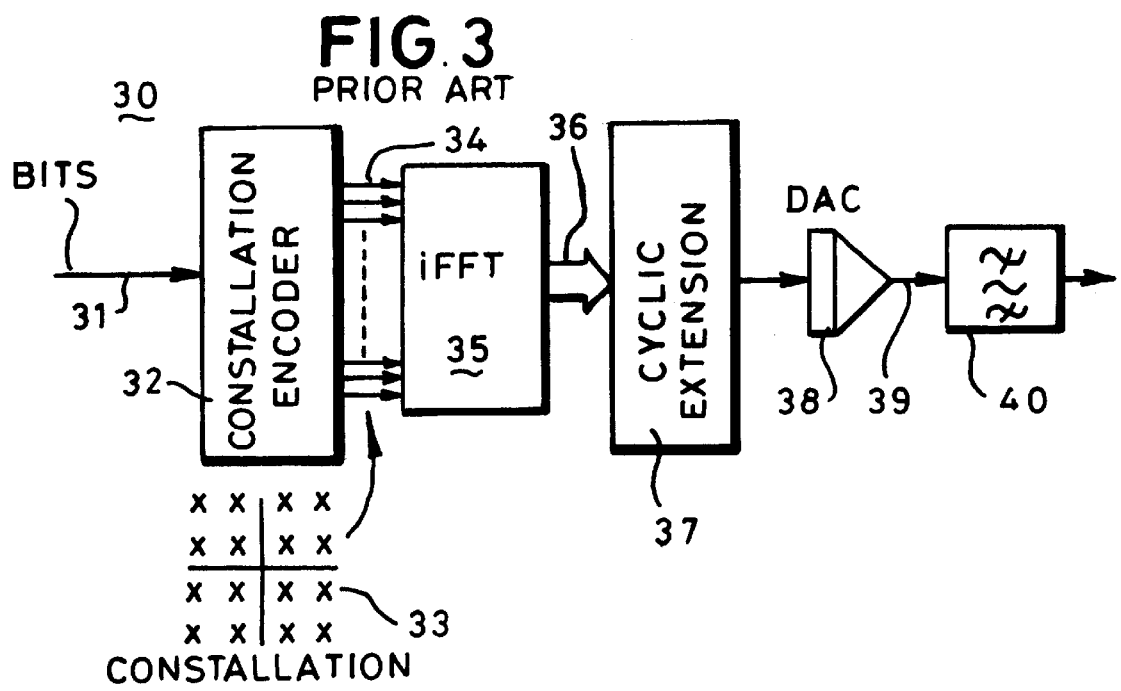
FIG. 3 is a block diagram of a prior art multicarrier transmitter.

FIG. 3 is a block diagram of a prior art multicarrier transmitter 30. As will be understood, the prior art multicarrier transmitter 30 receives information bits 31 (usually in the form of serial data stream of logical values) for modulation onto a plurality of sub-channels. Each sub-channel is made up from two frequency components; one positive and one negative. A constellation encoder 32, receptive to the information bits 31, has a modulation scheme that plots consecutive information bits 31 into an associated constellation 33 of states. More particularly, the information bits 31 are first applied to a serial-to-parallel converter (not shown) that converts the information bits into parallel data words which in turn are input into the constellation encoder 32. Codeword vectors 34 (sometimes referred to as "frequency domain encoded data" or "constellation values") output from the constellation encoder 32 are then applied to an iFFT processing block 35 (typically implemented in a processor), with individual elements of the codeword vectors 34 representing discrete frequency sub-channels. Outputs 36 from the iFFT processing block 35 are therefore time samples of corresponding individual elements applied to the inputs thereof, with the time samples therefore representing a symbol that is to be transmitted. Typically, a cyclic extension block 37 is coupled to the outputs 36 of the iFFT processing block 35, which cyclic extension block 37 applies a cyclic extension as a prefix or suffix to the outputs 36. Following cyclic extension, a DAC generates an analog signal 39 suitable for transmission, whereafter the analog signal is filtered in filter 40 having an appropriately shaped characteristic.

Operational control of the multicarrier transmitter of FIG. 3 is performed by a microprocessor (not shown), as will be readily understood.

Figure 4:
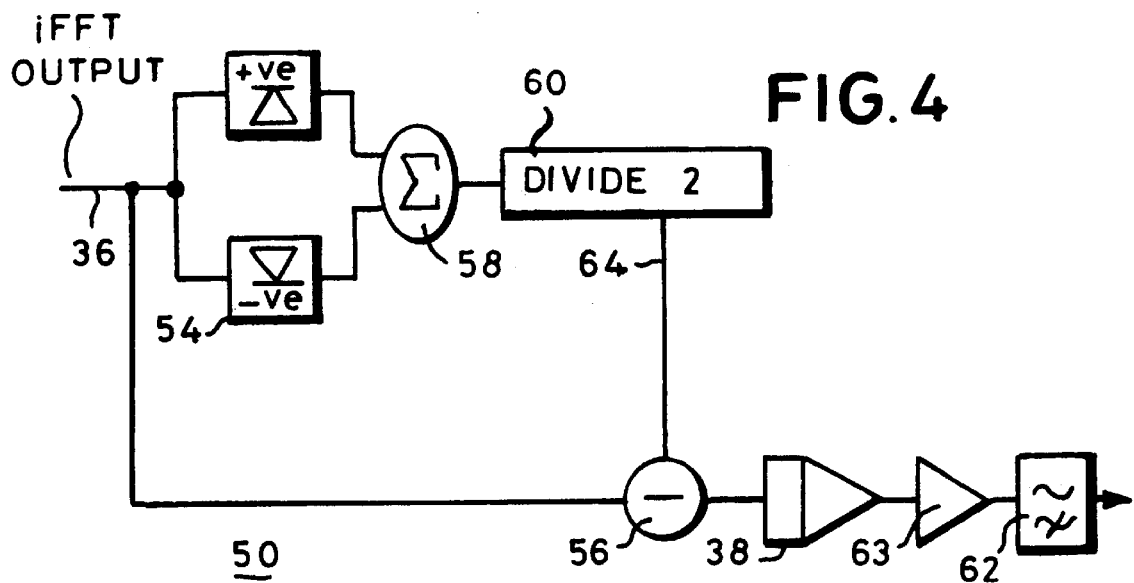
FIG. 4 shows a block diagram of a PAR reduction circuit according to a preferred embodiment of a first aspect of the present invention.

Turning now to FIG. 4 a block diagram of a PAR reduction circuit 50 constructed in accordance with a preferred embodiment of a first aspect of the present invention is shown. The PAR reduction circuit 50 is for use with a multicarrier modulator and preferably with a DMT encoder The PAR reduction circuit is particularly applicable to an ADSL (or VDSL) system because there is no need to modify existing receiver circuitry. The PAR reduction circuit 50 is responsive to the signal outputs 36 from the iFFT 35 of FIG. 3. The signal outputs 36 are split and separately applied to either a parallel combination of a peak level detector 52 and a trough level detector 54 (that respectively co-operate to quantify the respective peak and trough values to the signal outputs 36) or alternatively to a signal subtraction block 56. First and second inputs to a signal summation block 58 are provided by the quantified outputs of the respective peak (or positive, +ve) level detector 52 and the trough (negative, −ve) level detector 54. An output from the summation block 58 provides an input to a divide-by-two circuit 60, while a resultant (halved) output 64 from the divide-by-two circuit 60 provides a second input to the subtraction block 56 An output from the subtraction unit 56 is applied, eventually, to a filter 62, which filter is typically a high pass filter. Usually, a DAC 38 and a power amplifier 63 are located in series between the output of the subtraction unit 56 and the filter 62. Although the filter 62 is illustrated as being located in the transmitter, it will be appreciated that the filter may also or alternatively be located in the receiver of the multicarrier system.

The functions performed by the individual components and the effects achieved by the PAR reduction circuit 50 will be described. Although the iFFT output is a non-linear signal, the effect achieved by the PAR reduction circuit 50 is equivalent to modulating the zero frequency tone of the iFFT output. Consequently, almost all spurious energies (associated with clipping of the DAC) are promoted to fall outside the frequency band and so can be eliminated through the use of the filter 62.

Now, referring briefly to FIG. 5 in which there is shown a flow diagram of a mechanism employed by the PAR reduction circuit of FIG. 4, it will be understood that the peak level detector 52 and the trough level detector 54 are arranged to identify and quantify 70–72 a relative level of the incident time domain samples. Preferably, on a symbol-by-symbol basis, these quantified levels are applied 74 to the series combination of the summation block 58 and the divide-by-two circuit 60 An output from the divide-by-two circuit 60 provides an offset 64 equal to the midpoint value between the peak and trough excursions of the composite signal profile of FIG. 2. Consequently, the subtraction of the offset (step 76) from the original signal outputs from the iFFT in the subtraction block 56 balances the signal outputs 36 such that the peak positive and peak negative samples have the same modulus (or size), whereafter the filter 62 can be used to remove 78 unwanted frequencies that have been introduced into the composite signal profile of FIG. 2. As will be appreciated, the mean signal level of the DMT system of the present invention is zero because the dc component carries no data and is not modulated.

The subtraction of the time-varying offset results in the insertion of low frequency energies into the DMT signal. It is possible to remove the vast majority of these unwanted low frequency energies using a low-cost band-pass or high-pass filter 62 positioned after the DAC and line amplifier, i.e. operational in the analog domain. Expressed in a different fashion, because a zero frequency carrier and other low frequency carriers are unused in the majority of multicarrier systems (such as ADSL, VDSL and DMT), the inserted time-varying offset is the zero frequency carrier signal and, as such, has no effect on the integrity of the data carried in the composite envelope. Therefore, use of the PAR reduction circuit 50 ensures that, on a block-by-block basis (i.e. one symbol at a time), the peak and trough values are substantially equal and opposite in magnitude.

Use of the preferred embodiment of the first aspect of the present invention yields an improvement in the performance of a multicarrier modulator to the tune of approximately 1.7 dB, which improvement is achieved without increasing the manufacturing cost associated with multi-carrier modulator and which improvement can be applied to existing xDSL systems.

In the context of the present invention, the term "negative frequency" relates to the direction of rotation of a phasor (vector) used to generate the time domain data from the frequency domain data, while it will be understood that the term "frequency" is the rate of change of phase. More particularly, once the initial phase and amplitude of a carrier are determined, the sign of the frequency determines whether the phasor rotates in a clockwise or counterclockwise rotation, and hence whether the frequency is positive or negative. As such, in a classical OFDM modulator based on an iFFT function, if a nominal value of "x" is applied to the positive frequency, f, then the complex conjugate x* is applied at the negative frequency −f.

FIG. 6 shows a block diagram of a PAR reduction circuit according to a preferred embodiment of a second aspect of the present invention. An iFFT block 35 receives, at its input, constellation values 88 in which logical zeros have been substituted for those carriers having a negative frequency. Suppression of the negative frequencies can be achieved using simple logical components (such as inverters or exclusive-OR gates) or through the use of a signal processing sub-routine in a microprocessor (generally indicated by tone data modification block 91).

The iFFT 35 is of complex form and has a size equal to the length of the input symbol in samples, i.e. for a codeword vector (symbol) input having 1024 sub-channels, the complex iFFT 35 is of a one thousand and twenty-four point construction such that a signal output therefrom will comprise one thousand and twenty-four time samples.

Separate real and imaginary outputs (reference numerals 92 and 94, respectively) are provided from the iFFT 35, which outputs are each subject to a scaling function in scaling (or multiplication) blocks 96–98. In the preferred embodiment of the present invention, the scaling function is a doubling function; the reason for which will later become clear. A multiplied output from each multiplication block is applied to distinct real and imaginary inputs 100–102 of a selection switch 103, the function and purpose of which will be described subsequently. Furthermore, each output from each multiplication block is tapped to provide individual input signals to a real peak/trough detector 104 and an imaginary peak/trough detector 106. In a similar way to the prior art, the peak/trough detectors 104–106, generally, provide a quantitative measure of the peaks and troughs of applied time samples (relative to an arbitrarily set datum level). Consequently, a pair of outputs (a positive output and a negative output) emanate from each of the peak/trough detectors 104–106, which outputs are all applied to a selection processor 108. An output from the selection processor 108, the function and purpose of which will be described subsequently, is applied to the selection switch 103 for the control thereof. An output from the selection switch 103 then feeds into a DAC, such as DAC 38 of FIG. 3.

In a classical multicarrier (especially a DMT) encoder, the negative frequency components are set to the corresponding complex conjugates of the positive frequency components. The modified DMT encoder of the preferred embodiment of the second aspect of the present invention, however, has its negative frequency components set to zero, as previously stated. This has the effect that the real part of the iFFT calculation is halved in magnitude; and this explains the requirement for a doubling scaling function.

It will be appreciated that the doubling function need not be applied to the outputs of the iFFT, but could occur elsewhere (e.g. at the inputs to the iFFT block 35 or within the analog gain stages).

Expressed in a different manner, in the classical OFDM system, an amplitude of the $i^{th}$ frequency component is the complex conjugate of the minus $i^{th}$ frequency component, while in the OFDM system of the second aspect of the present invention the amplitude of all negative frequency components is set to zero. The second aspect of the present invention therefore produces a complex output that has a real output equal to half the output that would have resulted from a classical OFDM modulator, and an imaginary output equal to half the output that would have resulted by applying a ninety degree phase rotation to the input values of the same classical modulator. More concisely, the imaginary part is the Hilbert transform of the real part.

The imaginary component of the output signal resulting from the processing of the positive frequency components has a significantly different characteristic to the real components of the same output signal and, in fact, is equivalent to the application of a different encoding scheme. In other words, the preferred embodiment of the second aspect of the present invention makes use of the real and imaginary alternatives of a single data set, and this provides an opportunity for the selection processor 108 to select the output data set (i.e. either the real components or the imaginary components) having either the most favourable peak-to-trough excursion or probability density function (in relation to the reduction of the overall PAR). Clearly, as will be understood, the selection sub-routine utilised by the selection processor will typically choose the output data set in which the largest numerical value is minimised.

In an alternative implementation of the second aspect of the present invention, the positive frequency components could be set to zero instead of the negative frequency components. This would, however, result in the time reversal of the output values. Buffering of the signal may then be desirable to generate chronologically ordered data. Furthermore, one could select arbitrary subsets of both the positive and negative frequency components (or carriers), wherein each carrier is represented as either a positive or negative frequency carrier but not both. The drawback of such a distributed approach is that there is an increase in the complexity of the coding scheme for no additional PAR reduction. Indeed, if the subset is anything other than either the entire but mutually exclusive positive or negative frequency components, then either the transmitter must necessarily relay control data to the receiver concerning the selection of frequency components (or the frequencies that have been suppressed), or the receiver must have a priori knowledge of the nature of the subset of frequency components (e.g. a look-up table).

As will now be understood, a preferred embodiment of the second aspect of the present invention generally chooses to suppress a selected subset of frequency components (or carriers) to zero; in this exemplary case, all negative frequencies. However, it would also be possible to act upon the constellation values using arbitrary but differing functions to modify the positive and negative frequency components. However, this could result in a sub-optimal system because setting either the positive or negative frequency components to zero is likely to achieve the greatest change in PAR. In fact, selecting a non-zero value introduces correlation between the real and imaginary parts of the output signal (which correlation is undesirable). Additionally, use of arbitrary functions will change the rms power of the real and imaginary output.components of the iFFT, and so a different scaling factor (other than two) may be required.

Figure 7:
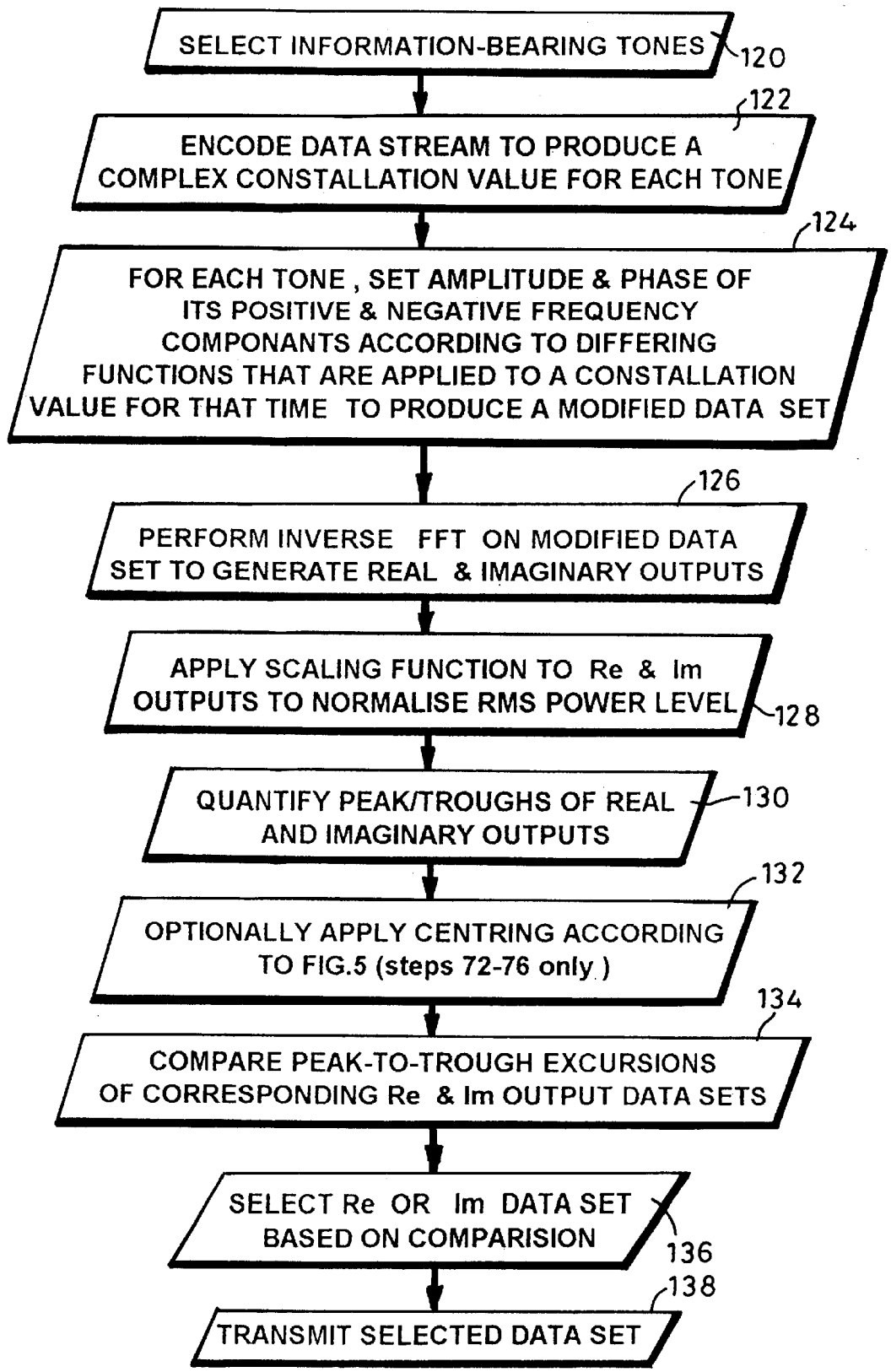
FIG. 7 is a flow chart of a mechanism employed by the PAR reduction circuit of FIG. 6.

For the sake of completeness, the basis process steps performed by the preferred embodiment of the second aspect of the present invention are shown in the flow diagram of FIG. 7. At step 120, a controller (such as a processor or filter) identifies and selects the information-bearing tones of interest. A data stream is encoded (modulated) 122 (in constellation encoder 32) to produce a complex constellation value for application to each tone. Then, for each tone, the amplitude and phase of its positive and negative frequency components are set according to differing functions applied to a constellation value for that tone, thereby producing a modified data set. An iFFT function is then performed 126 on the modified data set to generate real ($\Re$e) and imaginary ($\Im$m) outputs Each real and imaginary output is then scaled 128 to normalise the rms power level Then, a peak/trough detector quantifies 130 a relative level of peak/trough excursions for the real and imaginary outputs, and then (optionally) centring 132 of the real and imaginary outputs occurs (in accordance with steps 72–76 of FIG. 5). Once quantified, a comparison 134, for example, of the peak-to-trough excursion of the corresponding real and imaginary output data sets is performed, and a selection 136 can then be made as to which of the real or imaginary data sets should be used in a subsequent transmission stage 138.

While the preferred embodiment of the second aspect of the present invention has been described as having a two-step process in which: i) identical constellation values are applied to the positive frequency components and negative frequency components of each information-bearing sub-channel; and then ii) different functions are applied to the constellation values of each sub-channel to produce a modified data signal, it will be appreciated that this two-step process can be realised in a single step. Specifically, these two-steps are equivalent to the step of modulating a data value onto constellation points by applying different functions to respective positive frequency components and negative frequency components of each information-bearing sub-channel tone to produce a modified data signal.

In the preferred embodiment of the second aspect of the present invention in which the negative frequencies are set to zero, both the real and imaginary output data sets from the iFFT contain a complete representation of the encoded data giving the freedom to choose whichever data set has the most advantageous signal statistics.

Since a modification to a multicarrier receiver is required the preferred embodiment of the second aspect of the present invention produces an ADSL solution departs from the present technical-standard for ADSL, but the underlying concept can, however, be applied without restriction to other forms of multicarrier systems, including VDSL and xDSL (generally).

FIG. 8 is block diagram of a multicarrier demodulator 140 according to a preferred embodiment of the second aspect of the present invention. Specifically, the structure of the multicarrier demodulator 140 includes an Analog-to-Digital Converter (ADC) 142 that is responsive to incident multicarrier signals 144, such multicarrier signals received by the demodulator via a radio, optical or wireline communication resource. The ADC provides digital representations 146 of the incident multicarrier signals 144 to a FFT 148, typically implemented in a microprocessor. The FFT 148 provides a plurality of outputs to a frequency domain equaliser (FEQ) 149 that compensates for phase and amplitude distortions introduced by the transmission medium. The FEQ 149 provides a plurality of outputs to a plurality of tone decoders; only one (identified by reference numeral 150) of which is shown for the sake of clarity. In this respect, the multicarrier demodulator 140 will contain n tone decoders for decoding n tones on n sub-channels, with tone decoder 150 merely associated with the $i^{th}$ tone (where i is an integer between 1 and n).

As will be understood, a conventional multicarrier signal includes an unmodulated reference (or "pilot") tone. The FFT 148 is arranged to detect the pilot tone and to route the pilot tone to a pilot tone processor 152 arranged to determine whether a phase change has been introduced into the pilot tone. More explicitly, if an alternate (i.e. imaginary) iFFT data set has been used in the multicarrier modulator, then the phase of the pilot tone is changed to indicate that the FEQ output values (on the n tones) must be rotated by ninety degrees (in an opposite sense to the encoding process) before output values of the FEQ are passed to a receiver slice and decoder block. In this respect, an output 154 (from the pilot tone processor 152) will contain the complex value ej of the pilot tone, whereby a numeric value for ej of one indicates ninety degree rotation while a numeric value of zero represents no phase rotation of the incident symbol.

It will be appreciated that the phase rotation could be performed before the FEQ operation.

Referring again to the particular structure shown in FIG. 8, each tone decoder includes both a double-ganged switch 156 (that is operationally controlled by the pilot tone processor 152) and some routing logic. The double-ganged switch 156 provides two inputs into a dedicated bit decoder 158; only one bit decoder is shown in the diagram for the sake of clarity.

Each bit decoder is then sequentially tapped to provide a recovered data stream of logical values 160.

Looking again at the $i^{th}$ frequency component while also referring to the flow chart of FIG. 9, real and imaginary portions of the $i^{th}$ frequency component are separated in the tone decoder 150 and are processed and routed to a corresponding bit decoder on the following basis. At step 180, a determination is made as to whether phase rotation has occurred. In the event that no phase rotation has occurred (step 182), the real and imaginary portions of the $i^{th}$ frequency component are respectively routed, via the double-ganged switch 156, to first 162 and second 164 inputs of the bit decoder. In the event that a phase rotation is detected, then the imaginary portion is first inverted (step 184) by inverter or exclusive-OR gate 166. Following inversion, the imaginary portion is routed to the first input 162 of the bit decoder 158, while the real portion is routed directly to the second input 164 of the bit decoder 158 (step 186). In other words, routing of the real portion to the bit decoder is reversed, while the imaginary portion is inverted and re-routed when phase rotation is detected. In either case, the bit decoder for the $i^{th}$ channel then decodes the information to produce logical values (step 188).

While the pilot tone may be used to indicate phase rotation of a symbol, it will be appreciated that other mechanisms can be adopted to indicate such a phase rotation. For example, any multicarrier signal that utilises a subset of normally available constellation points is inherently capable of being able to identify a phase rotation, e.g. through the demodulator determining a dominant quadrant of the constellation in which a majority of the subset is located. Alternatively or additionally, a majority voting scheme could be used where three or more pilot tones are available.

The different aspects of the present invention therefore provide mechanisms for reducing the PAR in a multicarrier signal. Indeed, the different aspects of the present invention can be used in isolation or in a complementary sense, i.e. both together, to further improve the performance and robustness of the multicarrier system. In fact, in a combined scenario and for a five hundred and twelve-carrier DMT system, for example, a performance gain of about 2.5 dB is achieved in relation to a PAR reduction.

When using the second aspect of the present invention (e.g. the frequency suppression technique), the selection processor 108 of FIG. 6 chooses the real and imaginary data set to minimise the deviation from zero of the resulting output signal. When used in combination with the centring algorithm (of the first aspect of the present invention), however, the optimum selection process is to minimise the peak-to-trough value of the resulting output signal. Furthermore, when used in combination, the circuitry for the centring algorithm (i.e. FIG. 4) can be placed after the selection switch 103 (of FIG. 6) or anywhere after the iFFT block 35 and before the selection switch 103 (but, in the latter respect, this would require two separate centring circuits for the real and imaginary output streams).

It will, of course, be appreciated that the above description has been given by way of example only and that modifications, such as the general application of these PAR reduction techniques to multicarrier systems, can be made within the scope of the present invention. Furthermore, as will be appreciated, clipping could occur before the DAC, in the DAC itself or in the analog circuitry after the DAC (although in the latter case the clip is more representative of a 'soft limiting function', as will be understood), but these three mechanism should nonetheless be considered as equivalent in relation to the solutions presented in the various aspects of the present invention.

We claim:

1. A circuit for a communication device arranged simultaneously to transmit information, represented by constellation values, on multiple sub-channels, the circuit comprising:

means for applying constellation values to positive frequency components and negative frequency components of each information-bearing sub-channel;

means for applying different functions to the constellation values of each sub-channel to produce a modified data set;

means for generating, from the modified data set, a time domain representation having real and imaginary parts;

means for identifying which of the real and imaginary parts has a lower peak to average signal ratio; and means for selecting one of the real and imaginary parts for transmission corresponding to the lower peak to average signal ratio.

2. The circuit of claim 1, wherein the positive frequency components and the negative frequency components of each of the sub-channels form first and second subsets containing mutually exclusive frequency components and wherein the different functions are applied to the constellation values of differing ones of the first and second subsets.

3. The circuit of claim 2, wherein the first subset contains the negative frequency components.

4. The circuit of claim 3, wherein one of the different functions is a zeroing function, whereby the first subset produces positive frequency components and zeros in the modified data set.

5. The circuit of claim 4, further comprising means for scaling the real and imaginary parts to normalise to a root-mean-square power level.

6. The circuit of claim 5, wherein the means for scaling is a doubling function.

7. The circuit of claim 2, wherein the first and second subsets contain a mixture of mutually exclusive positive frequency components and negative frequency components.

8. The circuit of claim 7, wherein one of the different functions is a zeroing function, whereby the first subset produces positive frequency components and zeros in the modified data set.

9. The circuit of claim 8, further comprising means for scaling the real and imaginary parts to normalise to a root-mean-square power level.

10. The circuit of claim 7, further comprising means for transmitting control data concerning a selection of frequency components in at least one of the first and second subsets.

11. The circuit of claim 1, wherein an amplitude and phase of the positive frequency components and the negative frequency components can be altered by the different functions.

12. The circuit of claim 2 wherein the first and second subsets contain equal numbers of frequency components.

13. The circuit of claim 1, wherein the means for identifying comprises means for comparing a probability density function of the real and imaginary parts.

14. The circuit of claim 1, wherein the means for identifying comprises means for comparing a peak-to-trough excursion of the real and imaginary parts.

15. The circuit of claim 1, further comprising a scaling unit coupled to receive the real and imaginary parts.

16. The circuit of claim 1, wherein the scaling unit is a doubling unit.

17. The circuit of claim 1, wherein the time domain representation is provided by an inverse fast Fourier transform function.

18. A multicarrier communication device comprising a transmitter and at least one of the circuits of claim 1.

19. A method of reducing a peak-to-average level of a multicarrier signal supporting a simultaneous transmission of information, represented by constellation values on multiple sub-channels, the method comprising the steps of:

applying identical constellation values to the positive frequency components and negative frequency components of each information-bearing sub-channel;

applying different functions to the constellation values of each sub-channel to produce a modified data signal;

generating, from the modified data signal, a time domain representation having real and imaginary parts;

identifying which of the real and imaginary parts has a lower peak to average signal ratio; and selecting one of the real and imaginary parts for transmission corresponding to the lower peak to average signal ratio.

20. The method of claim 19, wherein the positive frequency components and the negative frequency components of each of the sub-channels form first and second subsets containing mutually exclusive frequency components, and the step of applying different functions to the constellation values includes the step of applying different functions to the first and second subsets.

21. The method of claim 20, wherein the first subset contains the negative frequency components.

22. The method of claim 21, wherein the step of applying different functions includes the step of assigning a zero value to the first subset to produce positive frequency components and zeros in the modified data signal.

23. The method of claim 22, further comprising the step of scaling the real and imaginary parts to normalise a root-mean-square power level.

24. The method of claim 23, wherein the scaling is a doubling function.

25. The method of claim 20 wherein the first and second subsets contain a mixture of mutually exclusive positive frequency components and negative frequency components.

26. The method of claim 25, wherein the step of applying different functions includes the step of assigning a zero value to the first subset to produce the modified data signal.

27. The method of claim 26, further comprising the step of scaling the real and imaginary parts to normalise a root-mean-square power level.

28. The method of claim 25, further comprising the step of transmitting control data concerning a selection of frequency components in at least one of the first and second subsets.

29. The method of claim 19, wherein the step of applying different functions to the constellation values includes the step of adjusting an amplitude and phase of each positive frequency component and each negative frequency component.

30. The method of claim 19, further including the steps of the method of claim 29.

31. A method of reducing a peak-to-average level of a multicarrier signal supporting a simultaneous transmission of information, represented by data values, on multiple sub-channel tones, the method comprising the steps of:

modulating a data value onto constellation points by applying different functions to respective positive frequency components and negative frequency components of each information-bearing sub-channel tone to produce a modified data signal;

generating, from the modified data signal, a time domain representation having real and imaginary parts;

identifying which of the real and imaginary parts has a lower peak to average signal ratio; and selecting one of the real and imaginary parts for transmission corresponding to the lower peak to average signal ratio.

32. The method of claim 31, wherein the positive frequency components and the negative frequency components of each of the sub-channel tones form first and second subsets containing mutually exclusive frequency components, and the step of applying different functions to the constellation values includes the step of applying different functions to the first and second subsets.

33. The method of claim 32, wherein the first subset contains the negative frequency components.

34. The method of claim 33, wherein the step of modulating includes the step of assigning a zero value to the first subset to produce positive frequency components and zeros in the modified data signal.

35. The method of claim 34, further comprising the step of scaling the real and imaginary parts to normalise a root-mean-square power level.

36. The method of claim 35, wherein the scaling is a doubling function.

37. The method of claim 32, wherein the first and second subsets contain a mixture of mutually exclusive positive frequency components and negative frequency components.

38. The method of claim 37, wherein the step of applying different functions includes the step of assigning a zero value to the first subset to produce the modified data signal.

39. The method of claim 38, further comprising the step of scaling the real and imaginary parts to normalise a root-mean-square power level.

40. The method of claim 37, further comprising the step of transmitting control data concerning a selection of frequency components in at least one of the first and second subsets.

41. The method of claim 31, wherein the step of applying different functions to the constellation values includes the step of adjusting an amplitude and phase of each positive frequency component and each negative frequency component.

42. The method of claim 31, further including the steps of the method of claim 29.

* * * * *